United States Patent [19]

Bertram et al.

[11] Patent Number: 4,827,171
[45] Date of Patent: May 2, 1989

[54] SINGLE-PHASE SYNCHRONOUS MOTOR COMPRISING A TWO-POLE PERMANENT-MAGNETIC ROTOR AND AN EDDY-CURRENT INTERMEDIATE ROTOR

[75] Inventors: Leo Bertram, Stolberg, Fed. Rep. of Germany; Hugo Schemmann, Schaesberg, Netherlands

[73] Assignee: U.S. Philips Corporation, New York, N.Y.

[21] Appl. No.: 129,512

[22] Filed: Dec. 7, 1987

[30] Foreign Application Priority Data

Dec. 6, 1986 [DE] Fed. Rep. of Germany ....... 3641744

[51] Int. Cl.[4] .......................................... H02K 21/00
[52] U.S. Cl. .................................. 310/162; 310/105; 310/156; 310/268
[58] Field of Search ............... 310/112, 154, 114, 180, 310/156, 184, 162, 163, 164, 90, 126, 103, 105, 268, 109, DIG. 2, 165; 324/137, 138

[56] References Cited

U.S. PATENT DOCUMENTS

| | | | |
|---|---|---|---|
| 1,497,394 | 6/1924 | Warren | 310/163 |
| 1,982,826 | 12/1934 | Nein et al. | 310/162 UX |
| 2,214,850 | 9/1940 | Arey | 310/163 |
| 2,725,494 | 11/1955 | Anderson | 310/162 |
| 2,810,085 | 10/1957 | Akeley | 310/DIG. 2 |
| 3,790,889 | 2/1974 | Mincuzzi | 310/156 |

FOREIGN PATENT DOCUMENTS 8400013 1/1985 Fed. Rep. of Germany .

Primary Examiner—R. Skudy
Attorney, Agent, or Firm—F. Brice Faller

[57] ABSTRACT

An eddy-current intermediate rotor (13) is fixed to the motor shaft (9) and is arranged to be rotatable between the stator-iron poles and the permanent-magnetic rotor (15) which is mounted for free rotation on the motor shaft (9). The rotor (15) and the eddy-current intermediate rotor (13) are disc-shaped and form a disc assembly (23) which can be axially magnetized via the stator-iron poles (3) on each side of the disc-assembly (23). A centrifugal coupling is provided, which acts to couple the rotor (15) to the eddy-current rotor when the disc assembly has come up to speed.

5 Claims, 2 Drawing Sheets

SINGLE-PHASE SYNCHRONOUS MOTOR COMPRISING A TWO-POLE PERMANENT-MAGNETIC ROTOR AND AN EDDY-CURRENT INTERMEDIATE ROTOR

BACKGROUND OF THE INVENTION

The invention relates to a single-phase synchronous motor comprising a two-pole permanent-magnetic rotor and an eddy-current intermediate rotor which is rotationally coupled to the motor shaft and which is arranged to be rotatable between the stator-iron poles and a permanent-magnetic rotor which is mounted for free rotation on the motor shaft.

Such a single-phase synchronous motor is known from DE-GmS 84 00 013. This motor has a cylindrical laminated stator in whose cylindrical interior two stator poles extend, which poles can be magnetised by exciter coils.

In the stator bore a permanent-magnetic cylindrical rotor and a cup-shaped eddy-current intermediate rotor made of copper are arranged on a motor shaft. The eddy-current intermediate rotor is rotationally coupled to the motor shaft and the permanent-magnetic rotor is mounted for free rotation on the motor shaft.

This single-phase synchronous motor thus also operates as a single-phase induction or asynchronous motor; it is preferably used for driving a pump. When this motor is started the permanent-magnetic rotor initially runs up to the synchronous speed and the eddy currents produced in the eddy-current intermediate rotor cause the intermediate rotor to accelerate asynchronously, i.e. substantially more slowly than the permanent-magnetic rotor. One of the advantages of this construction is that the starting torque is substantially larger than that of a true single-phase synchronous motor.

This construction is intricate and results in bearing problems because the cup-shaped intermediate rotor is supported at one end only. Manufacturing such a cup-shaped intermediate rotor is expensive and its bearing construction is critical.

SUMMARY OF THE INVENTION

According to the invention, the rotor and the eddy-current intermediate rotor are disc-shaped and both discs form a disc assembly which can be magnetized axially by the stator field via stator-iron poles which are situated at axially opposite sides of the disc assembly.

Such a construction exhibits a high starting torque, is simple, can be manufactured economically, and is not very sensitive to tolerances.

In a further embodiment of the invention, the stator coils are arranged on iron yokes which interconnect the stator-iron poles externally of the disc assembly, the stator-iron poles carrying the bearings of the motor shaft. Thus, the entire motor has a disc-like construction, which is extremely stable because it is not loaded on one side only.

As is known, a loaded eddy-current intermediate rotor cannot reach the full synchronous speed of the permanent-magnetic rotor. To mitigate this drawback, in accordance with a further embodiment of the invention, the intermediate rotor is provided with a centrifugal coupling which acts to couple the permanent-magnetic rotor to the intermediate rotor. Such a centrifugal coupling provides an increased coupling action between the permanent-magnetic rotor and the eddy-current intermediate rotor as the speed increases, so that ultimately when the coupling is complete the permanent-magnetic rotor drives the eddy-current intermediate rotor with the synchronous speed. In this way, the advantages of an eddy-current intermediate rotor are combined with those of a single-phase synchronous motor.

From U.S. Pat. No. 2,214,850 it is known to support a permanent-magnetic rotor for free rotation on a shaft carrying a steel disc. Both rotors are disposed in the magnetic field of a stator, which in addition to the main coil in accordance with the shaded-pole principle carries a further short-circuiting coil. Thus, the stator provides a magnetic field with rotating components. The motor is started in such a way that the steel disc with the load runs up asynchronously. After starting and subsequent coupling to the steel disc, the permanent-magnetic rotor improves the motor efficiency. This construction does not relate to an intermediate rotor but to two motors which operate in parallel, which have different operating principles and a common stator. The steel disc and the permanent-magnetic rotor are situated adjacent each other in parallel planes and parallel to the stator-magnet field.

In a further embodiment of the invention, the centrifugal coupling comprises spring-loaded centrifugal weights arranged to be slidable in radial guides and spring-loaded towards a coupling surface of the rotor. The centrifugal weights and guides may be formed in parts which are moulded on the permanent-magnetic rotor and on the eddy-current intermediate rotor. In a suitable embodiment of the invention, the rotor is therefore provided with a non-metallic outer flange surrounding the rotor periphery to form an annular space which is engaged by a non-metallic inner flange arranged on the intermediate rotor disc and formed with guides for the outwardly spring-loaded centrifugal weights.

DETAILED DESCRIPTION OF THE PREFERRED EMBODIMENTS

Figure 1:
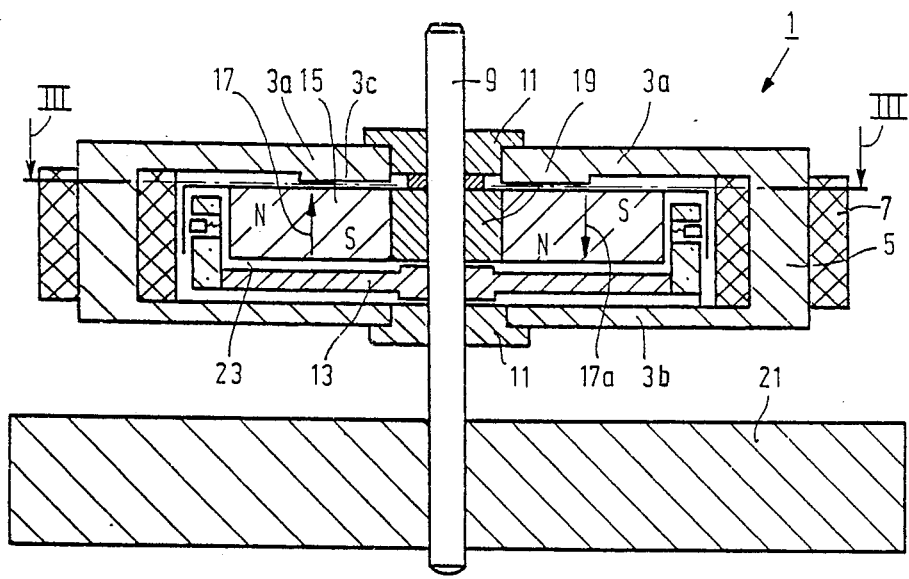
FIG. 1 is a sectional view of a single-phase synchronous motor comprising an eddy-current intermediate rotor.

FIG. 1 shows a single-phase synchronous motor 1 constructed as a motor with an intermediate rotor. The single-phase synchronous motor 1 comprises two strip-shaped soft-magnetic stator poles in the form of iron limbs 3a which are interconnected by iron yokes 5 at the sides which are remote from each other to two respective strip-shaped soft-magnetic iron poles 3b. The limbs 3a have asymmetrical salient parts 3c, which serve to rotate the permanent-magnetic rotor into such a rest position that the torque exerted on the rotor by the exciter coils is not zero. Another possibility of obtaining this rotation is to provide the iron limbs 3a with asymmetrical recesses. These iron yokes 5 carry exciter coils 7. The single-phase synchronous motor comprises a motor shaft 9 which is mounted for rotation in the iron poles 3a, 3b, by means of bearings 11. A copper disc 13 is fixed to the motor shaft 9 and functions as eddy-current intermediate rotor. A permanent-magnetic rotor disc 15, which is magnetized in the axial direction (indicated by arrows 17), is arranged axially parallel adjacent the copper rotor disc 13 and is journalled for free rotation about the motor shaft 9 by means of a bearing 19. The motor shaft 9 carries a load 21.

It is to be noted again that the copper disc 13 used as eddy-current rotor is arranged directly adjacent the two-pole permanent-magnetic rotor disc 15, the two discs 13, 15 constituting a rotatable disc assembly 23 for driving the load 21.

When the coils 7 are energized, the intermediate rotor disc 13 and the permanent magnetic rotor disc 15 are axially magnetized, the flux in the two motor halves being directed oppositely as is indicated by the arrows 17 and 17a. This causes the rotor 15 to run up to its synchronous speed. In the intermediate rotor disc 13 eddy-currents are generated. The intermediate rotor disc 13, which is loaded by the load 21, runs up to speed slowly and, depending on the load, it reaches a speed below the synchronous speed.

Obviously, care must be taken that the stator coils, as is known, are constructed asymmetrically.

Figure 2:
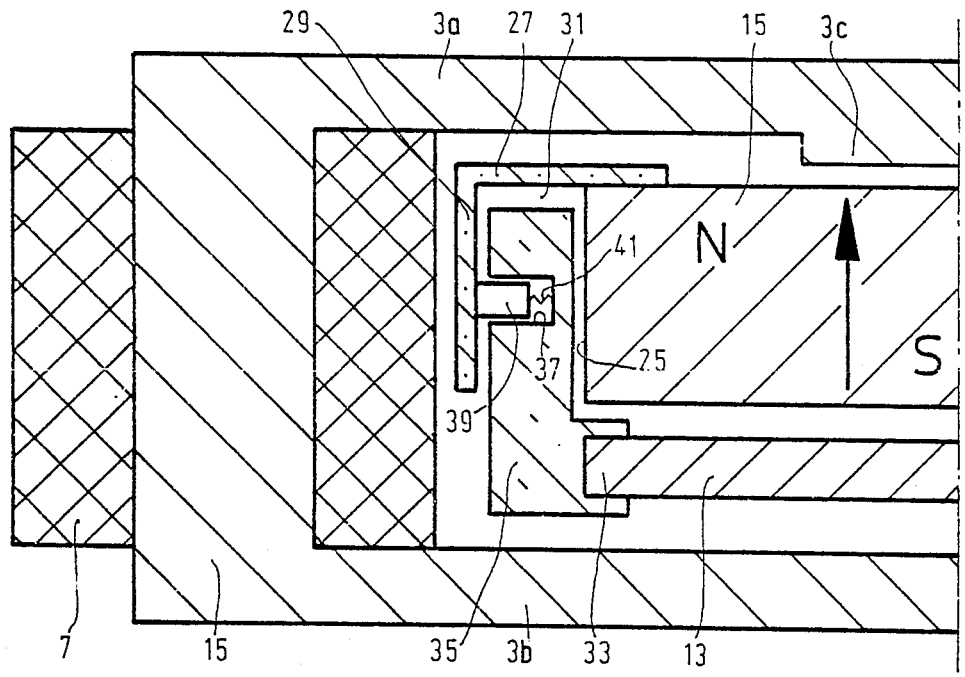
FIG. 2 is an enlarged-scale sectional view of the centrifugal coupling between the permanent-magnetic rotor and the intermediate rotor.

If it is required or desirable for the load 21 to reach the synchronous speed of the rotor disc 15, a centrifugal coupling is utilized. This centrifugal coupling, which is only indicated in FIG. 1, is shown to an enlarged scale for one motor half in FIG. 2. The periphery 25 of the rotor disc 15 is provided with a moulded-on flange 27 having a cylindrical wall 29, so that an annular space 31 is formed between this cylindrical wall and the rotor periphery 25. Preferably, the moulded-on flange 27 is made of a non-metallic material, such as plastic. The periphery 33 of the intermediate rotor disc 13 is also provided with an inner wall in the form of a plastic flange 35 which extends freely in the annular space 31. This flange 35 is formed with radial guides 37 in which centrifugal weights 39 are radially slidable. Springs 41 urge the centrifugal weights 39 out of the guides 37 against a coupling surface of the cylindrical wall 29.

The springs 41 press the centrifugal weights 39 constantly against the cylindrical wall 29 of the rotor disc 15. However, the pressure is minimal, so that no significant braking action is exerted on the rotor disc 15. As the intermediate rotor disc 13 runs up to speed the force exerted on the cylindrical wall 29 of the rotor disc 15 by the centrifugal weights 39 increases. Consequently, the friction between the rotor disc 15 and the intermediate rotor disc 13 increases. Ultimately, the intermediate rotor disc 13 is therefore driven not only by the eddy-current action but also by the permanent-magnet rotor 15. When the speed of the intermediate rotor 13 is high enough and the centrifugal force acting on the centrifugal weights 39 is large enough, a completely rigid coupling is established between the intermediate rotor disc 13 and the permanent-magnet disc 15, whereby the intermediate rotor disc 13 is accelerated to the synchronous speed.

Figure 3:
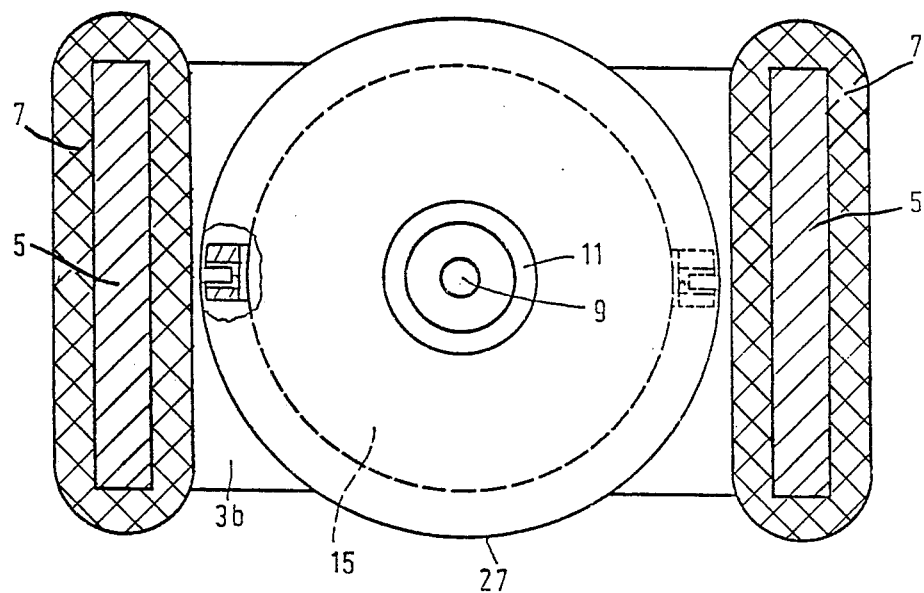
FIG. 3 is a sectional view of the motor taken on the line III—III in FIG. 1 to illustrate the relation between the stator and the rotor.

In the sectional view of FIG. 3, the iron limbs 3a which are situated at the top in FIG. 1 have been omitted to show the interior of the motor. Between the iron yokes 5 carrying the exciter coils 7 the permanent-magnetic rotor 15 and the intermediate rotor disc 13 are situated one above the other. The bearing 19 supports the permanent-magnetic rotor so that it is freely rotatable on the shaft 9.

What is claimed is:

1. A single-phase synchronous motor having a motor shaft defining the axis of the motor, said motor further comprising
    a stator comprising two pairs of soft-magnetic stator poles, each pair of poles being connected by a yoke surrounded by an exciter coil which produces an axial stator field between each pair of poles,
    a two-pole permanent magnet rotor disc journalled for free rotation about said motor shaft and lying between the poles of each pair, and
    an eddy-current intermediate rotor disc fixed to said motor shaft adjacent said permanent magnet rotor disc and likewise lying between the poles of each pair.

2. A single phase synchronous motor as in claim 1 further comprising a pair of bearings carried by the stator poles, said motor shaft being journalled in said bearings.

3. A single-phase synchronous motor as in claim 1 further comprising centrifugal coupling means effective to rigidly couple said intermediate rotor disc to said permanent magnet rotor disc as the speed of the intermediate rotor disc when the speed of said intermediate rotor disc is accelerated to synchronous speed.

4. A single-phase synchronous motor as in claim 3 wherein said centrifugal coupling means comprises radial guides fixed to said intermediate rotor disc, spring-loaded centrifugal weights slidably arranged in said radial guides, and a coupling surface fixed to said permanent magnet rotor.

5. A single-phase synchronous motor as in claim 4 wherein said permanent-magnet rotor disc is provided with a non-metallic cylindrical outer wall having said coupling surface thereon, said wall being spaced from the periphery of said permanent-magnet rotor disc to form an annular space therebetween, said intermediate rotor disc having a non-metallic cylindrical inner wall upstanding from the periphery thereof and extending into said annular space, said inner wall having said radial guides formed therein.

* * * * *